(12) United States Patent
Numata

(10) Patent No.: US 9,278,426 B2
(45) Date of Patent: Mar. 8, 2016

(54) ELECTRIC POWER TOOL

(75) Inventor: Fumitoshi Numata, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 819 days.

(21) Appl. No.: 13/494,562

(22) Filed: Jun. 12, 2012

(65) Prior Publication Data

US 2013/0023189 A1    Jan. 24, 2013

(30) Foreign Application Priority Data

Jul. 22, 2011   (JP) ................................ 2011-161126

(51) Int. Cl.
| | |
|---|---|
| B24B 23/02 | (2006.01) |
| B24B 55/00 | (2006.01) |
| B25F 5/00 | (2006.01) |
| B23Q 11/00 | (2006.01) |

(52) U.S. Cl.
CPC ............ *B24B 55/00* (2013.01); *B23Q 11/0092* (2013.01); *B24B 23/02* (2013.01); *B25F 5/00* (2013.01)

(58) Field of Classification Search
CPC ...... B24B 23/02; B24B 23/022; B24B 55/00; B25F 5/00; B25F 5/001; B23Q 11/0092
USPC .................. 451/344, 359; 173/216, 217, 170; 188/72.2
See application file for complete search history.

(56) References Cited

U.S. PATENT DOCUMENTS

| | | | | |
|---|---|---|---|---|
| 4,029,159 | A  * | 6/1977 | Nymann | 173/217 |
| 4,480,205 | A  * | 10/1984 | Nymann | 310/77 |
| 7,537,065 | B2 * | 5/2009 | Gallagher et al. | 173/170 |
| 2005/0224325 | A1* | 10/2005 | Turley | 200/50.32 |
| 2009/0193669 | A1* | 8/2009 | Gorenflo | 30/382 |

FOREIGN PATENT DOCUMENTS

| | | |
|---|---|---|
| EP | 1 938 924 A1 | 7/2008 |
| EP | 2 138 279 A1 | 12/2009 |

OTHER PUBLICATIONS

Office Action issued in Japanese Patent Application No. 2011-161126 dated Sep. 9, 2014 (with translation).
Jun. 23, 2014 Extended European Search Report issued in European Application No. 12171656.7.

* cited by examiner

*Primary Examiner* — Eileen Morgan
(74) *Attorney, Agent, or Firm* — Oliff PLC

(57) ABSTRACT

In a grinder, a motor is accommodated in a housing so that an output shaft faces forward, a paddle switch that turns on and off a drive switch of the motor is supported by the housing so that the paddle switch can be operated to move in a direction perpendicular to the output shaft of the motor, and a brake device that brakes rotation of the output shaft is provided on a front side of the motor in the housing. The grinder includes a cooperative mechanism that releases the brake device in response to a pushing operation of pushing the paddle switch toward the housing to turn on the drive switch.

9 Claims, 13 Drawing Sheets

ELECTRIC POWER TOOL

BACKGROUND OF THE INVENTION

This application claims the benefit of Japanese Patent Application Number 2011-161126 filed on Jul. 22, 2011, the entirety of which is incorporated by reference.

TECHNICAL FIELD

The present invention relates to electric power tools including an operation member that can be operated to move in a direction perpendicular to an output shaft of a motor accommodated in a housing, and that turns on and off a drive switch of the motor, and a brake device that brakes rotation of the output shaft.

BACKGROUND ART

For example, European Patent Application Publication No. 1,938,924 discloses an electric power tool including a device (a brake device) that brakes an output shaft of a motor after a switch of the electric power tool is turned off. In the brake device described in this publication, when the switch is turned off, a corresponding brake disc is pressed against a brake disc fixed to the output shaft, due to a biasing force of a spring. Thus, the output shaft having the brake disc fixed thereto can be stopped.

On the other hand, when a slider located on an upper surface of a housing is manually operated to turn on the switch of the electric power tool, a rod-shaped coupling member coupled to the slider slides in an axial direction of the output shaft. When sliding in the axial direction to release the brake device, the coupling member presses, in the axial direction, an upper end of an operation mechanism, which is coupled to the corresponding brake disc. Thus, the operation mechanism is tilted with respect to a direction perpendicular to the axial direction. As the operation mechanism is tilted, the corresponding brake disc moves in the axial direction against the biasing force of the spring, and is released from the brake disc. As a result, the output shaft can be rotated.

Electric power tools such as a grinder are provided with an operation member. The operation member is supported by a housing accommodating a motor, so that the operation member can be operated to move in a direction perpendicular to an output shaft of the motor. The operation member thus turns on and off a drive switch of the motor. In such electric power tools, the operator holds the operation member with his or her hand and pushes the operation member toward the housing to turn on the drive switch of the motor.

For example, even if the operator accidentally drops the electric power tool while working at a high place with the electric power tool, the operation member moves in a direction away from the housing when the operator's hand is released from the operation member, whereby the drive switch of the motor is turned off. Accordingly, the electric power tool including the operation member is advantageous in its easy actuation, because the operator can turn on and off the drive switch of the motor by merely pushing the operation member toward the housing or releasing his or her hand from the operation member. In recent years, it has been desired for electric power tools to include such a brake device that can brake rotation of the output shaft of the motor while maintaining the operability of the electric power tools, as described above.

SUMMARY OF THE INVENTION

The present invention has been developed in view of such situations, and it is an object of the present invention to provide an electric power tool that is easy to operate, and that includes a brake device that brakes rotation of an output shaft of a motor.

According to a first aspect of the present invention, an electric power tool includes a housing, a motor accommodated in the housing so that an output shaft faces forward, an operation member that is supported by the housing so that the operation member can be operated to move in a direction perpendicular to the output shaft of the motor, and that turns on and off a drive switch of the motor, a brake device that is provided on a front side of the motor in the housing to brake rotation of the output shaft, and a cooperative mechanism that releases the brake device in response to a pushing operation of pushing the operation member toward the housing to turn on the drive switch.

According to a second aspect of the present invention, in the electric power tool according to the first aspect, the cooperative mechanism includes a slide member that is accommodated in the housing, and that is capable of sliding toward the front side in response to the pushing operation of the operation member, the slide member slides toward the front side to release the brake device, and a cooperative position where the sliding movement of the slide member is made in response to the pushing operation of the operation member is located on a rear side of the motor.

According to a third aspect of the present invention, in the electric power tool according to the second aspect, a first tilted surface is provided in at least one of the operation member and the slide member at the cooperative position, so that in the pushing operation, the slide member is guided by the first tilted surface to make the sliding movement.

According to a fourth aspect of the present invention, in the electric power tool according to the third aspect, the first tilted surface is provided in the operation member at the cooperative position, and a rolling element that rolls on the first tilted surface in the pushing operation is provided in the slide member at the cooperative position.

According to a fifth aspect of the present invention, in the electric power tool according to the fourth aspect, the operation member at the cooperative position includes a second tilted surface formed on a back side of the first tilted surface, and the second tilted surface engages with the slide member, and causes the slide member to slide toward the rear side as the operation member moves in a direction away from the housing in the perpendicular direction.

According to a sixth aspect of the present invention, in the electric power tool according to the first aspect, the electric power tool further includes a biasing unit that biases the operation member toward an OFF side of the drive switch in a direction away from the housing in the perpendicular direction when braking the rotation of the output shaft.

According to a seventh aspect of the present invention, in the electric power tool according to the first aspect, the housing is provided with a fulcrum portion that supports the operation member so that the operation member is turnable in the perpendicular direction, and the operation member is capable of being operated to move in the perpendicular direction about the fulcrum portion.

According to an eighth aspect of the present invention, in the electric power tool according to the second aspect, the brake device includes a brake member that is held in the housing and that is capable of moving to and away from a brake plate fixed to the output shaft while rotating, and the slide member is provided with a pressing member that contacts the brake member to rotate the brake member in such a rotation direction that the brake member separates from the brake plate.

According to the first aspect, since the electric power tool includes the cooperative mechanism, the brake device can be released in response to the pushing operation of the operation member. Accordingly, the electric power tool can be provided with the brake device, and can still be easily operated.

According to the second aspect, the slide member that releases the brake device can be made to slide in response to the pushing operation, from the cooperative position located away from the brake device provided on the front side of the motor. Thus, the operation of releasing the brake device can be performed at the position located away from the brake device.

According to the third aspect, the slide member slides by using the tilted surface of at least one of the operation member and the slide member, whereby the slide movement can be smoothly made.

According to the fourth aspect, the slide member slides as the rolling element rolls on the first tilted surface. The use of the rolling element reduces the frictional resistance of the contact portion between the rolling element and the first tilted surface. This allows the slide member to smoothly make the slide movement.

According to the fifth aspect, when the operation member moves in the direction away from the housing in the direction perpendicular to the output shaft of the motor, the use of the second tilted surface engaged with the slide member allows the slide member to smoothly slide toward the rear side of the motor.

According to the sixth aspect, when the pushing operation of the operation member is cancelled, the operation member can be reliably restored to the OFF side of the drive switch due to the biasing force of the biasing unit.

According to the seventh aspect, providing the housing with the fulcrum portion of the operation member can facilitate the operation of pushing the operation member toward the housing.

According to the eighth aspect, as the brake member is rotated in such a rotation direction that the brake member separates from the brake plate using the pressing member, the moment of force that is applied to the brake member can be reduced. Accordingly, satisfactory operability is obtained when releasing the brake device.

DETAILED DESCRIPTION OF THE EMBODIMENTS

Figure 1:
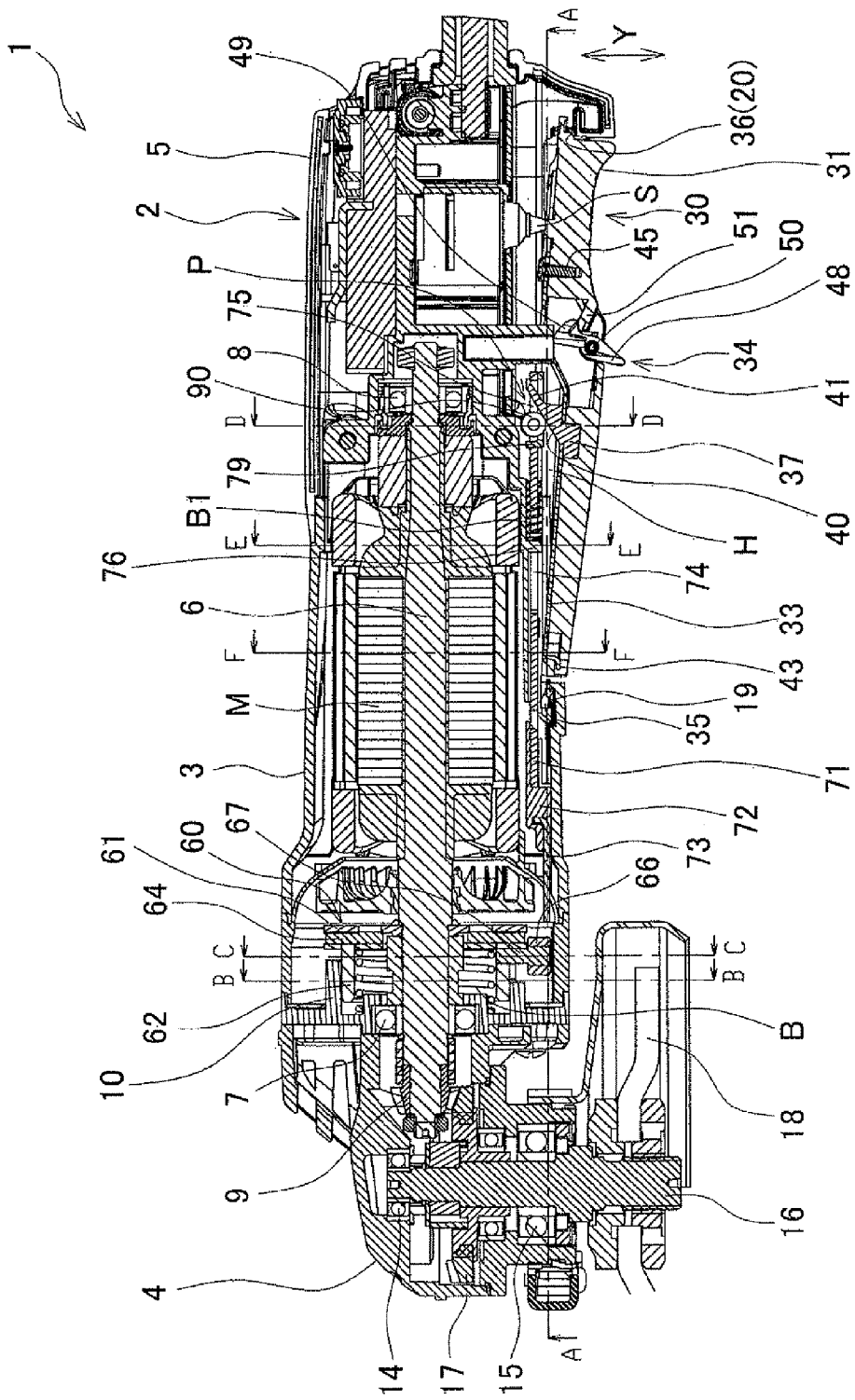
FIG. 1 is a side-sectional view of a grinder according to an embodiment of the present invention.
Figure 2:
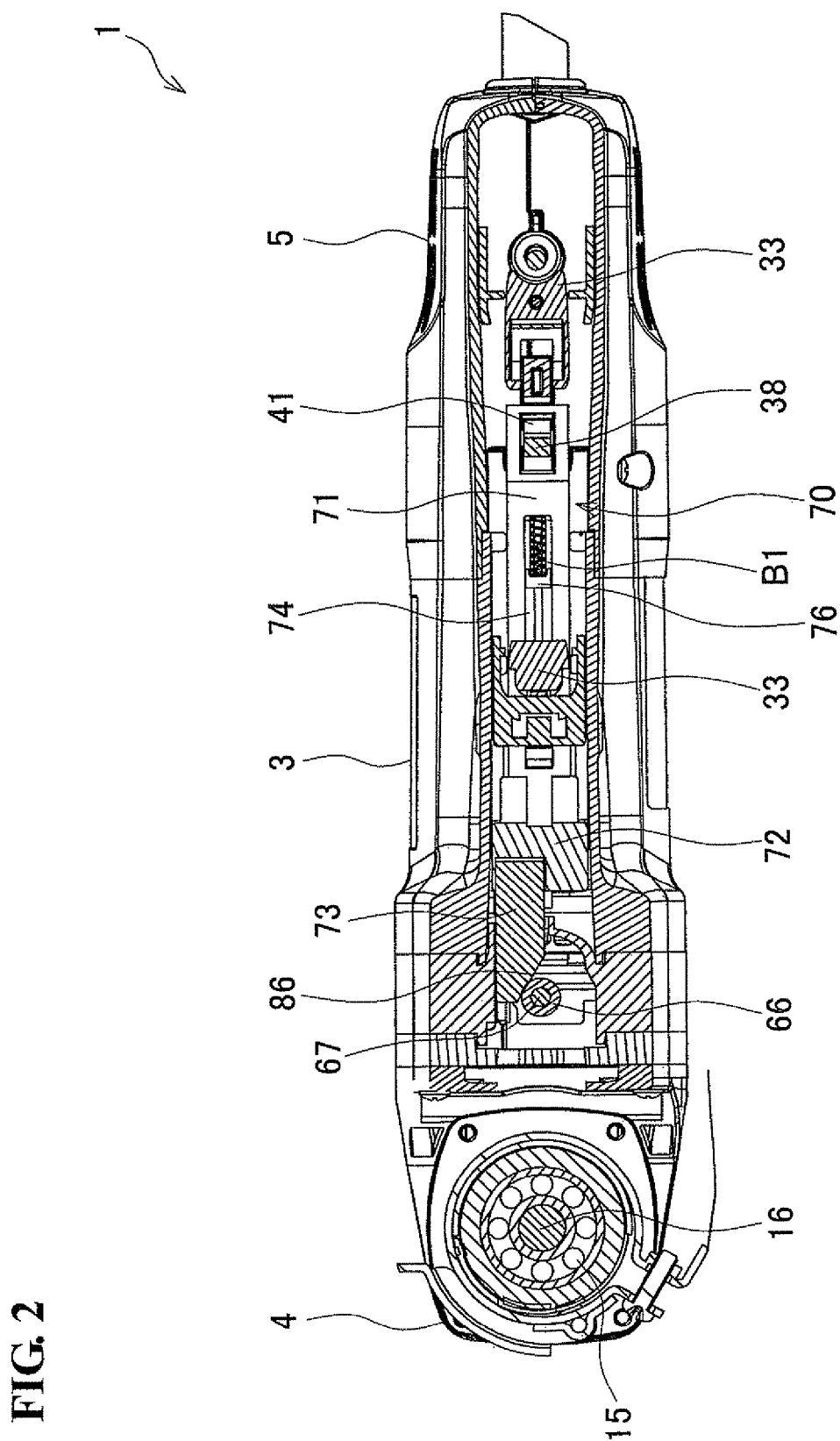
FIG. 2 is a cross-sectional view taken along line A-A in FIG. 1.

An embodiment of the present invention will be described below with reference to FIGS. 1 to 13. As shown in FIGS. 1 and 2, a grinder 1 includes a housing 2, a paddle switch 30, a brake device 60, and a slide member 70. The grinder I is an example of the electric power tool of the present invention.

The housing 2 includes a motor housing 3, a gear housing 4, and a rear cover 5. A motor M is accommodated in the motor housing 3 so that an output shaft 6 faces forward (leftward in FIG. 1). The output shaft 6 of the motor M is rotatably supported in the motor housing 3 via bearings 7, 8. A first bevel gear 9 is fitted on a tip end of the output shaft 6.

Figure 3:
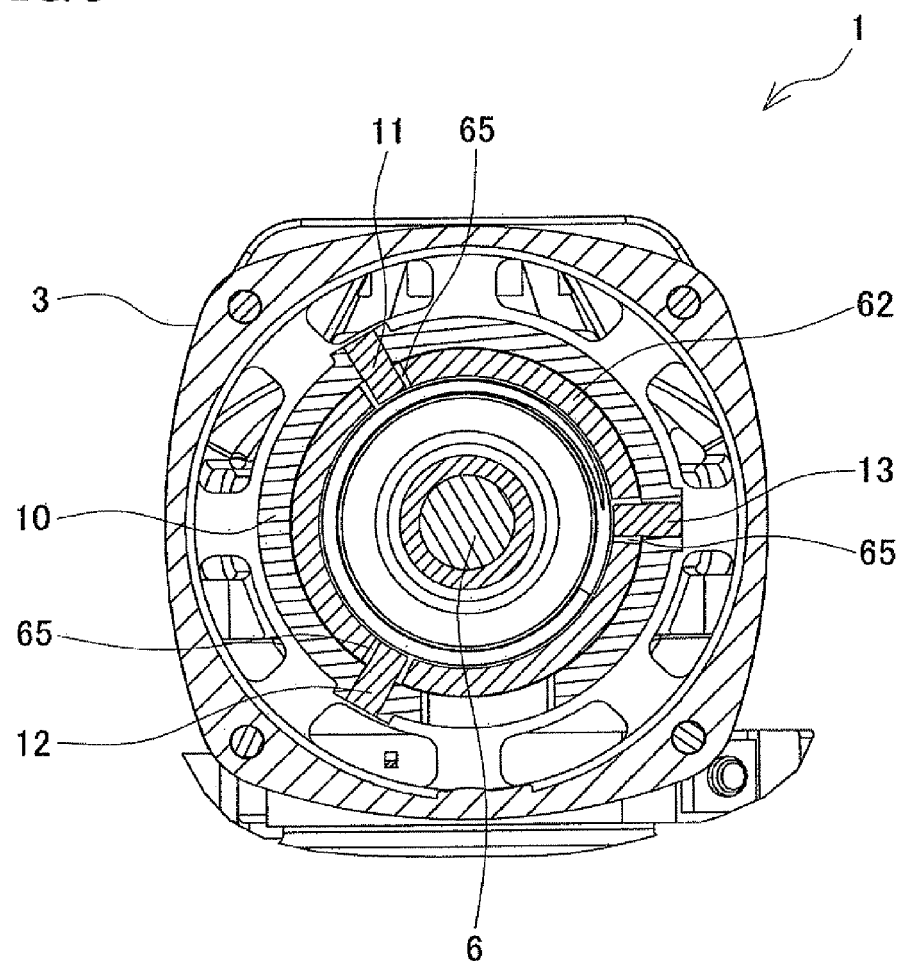
FIG. 3 is a cross-sectional view taken along line B-B in FIG. 1.

An annular rib 10 is provided in the motor housing 3 so as to protrude in a longitudinal direction of the motor housing 3 (a lateral direction in FIG. 1). As shown in FIG. 3, first to third shift pins 11 to 13 are fixed to the annular rib 10 so as to protrude toward a central axis of the annular rib 10. The shift pins 11 to 13 are positioned at regular intervals in a circumferential direction of the annular rib 10 and protrude toward the central axis.

The gear housing 4 is attached to the front end (the left end in FIGS. 1 and 2) of the motor housing 3. As shown in FIG. 1, the output shaft 6 protrudes beyond the motor housing 3 into the gear housing 4. In addition, a spindle 16 is rotatably supported in the gear housing 4 via bearings 14, 15 so as to extend perpendicular to the output shaft 6. A second bevel gear 17 is fitted to the upper portion of the spindle 16. The first bevel gear 9 meshes with the second bevel gear 17, whereby rotation of the output shaft 6 is transmitted to the spindle 16. A disc-shaped grinding stone 18 is attached to a lower end of the spindle 16. A material to be ground is ground by the grinding stone 18.

The rear cover 5 is attached to the rear end (the right end in FIGS. 1 and 2) of the motor housing 3. As shown in FIG. 1, a switch S capable of switching the motor M between an ON state and OFF state is accommodated in the rear cover 5. The switch S is an example of the drive switch of the present invention.

Figure 10:
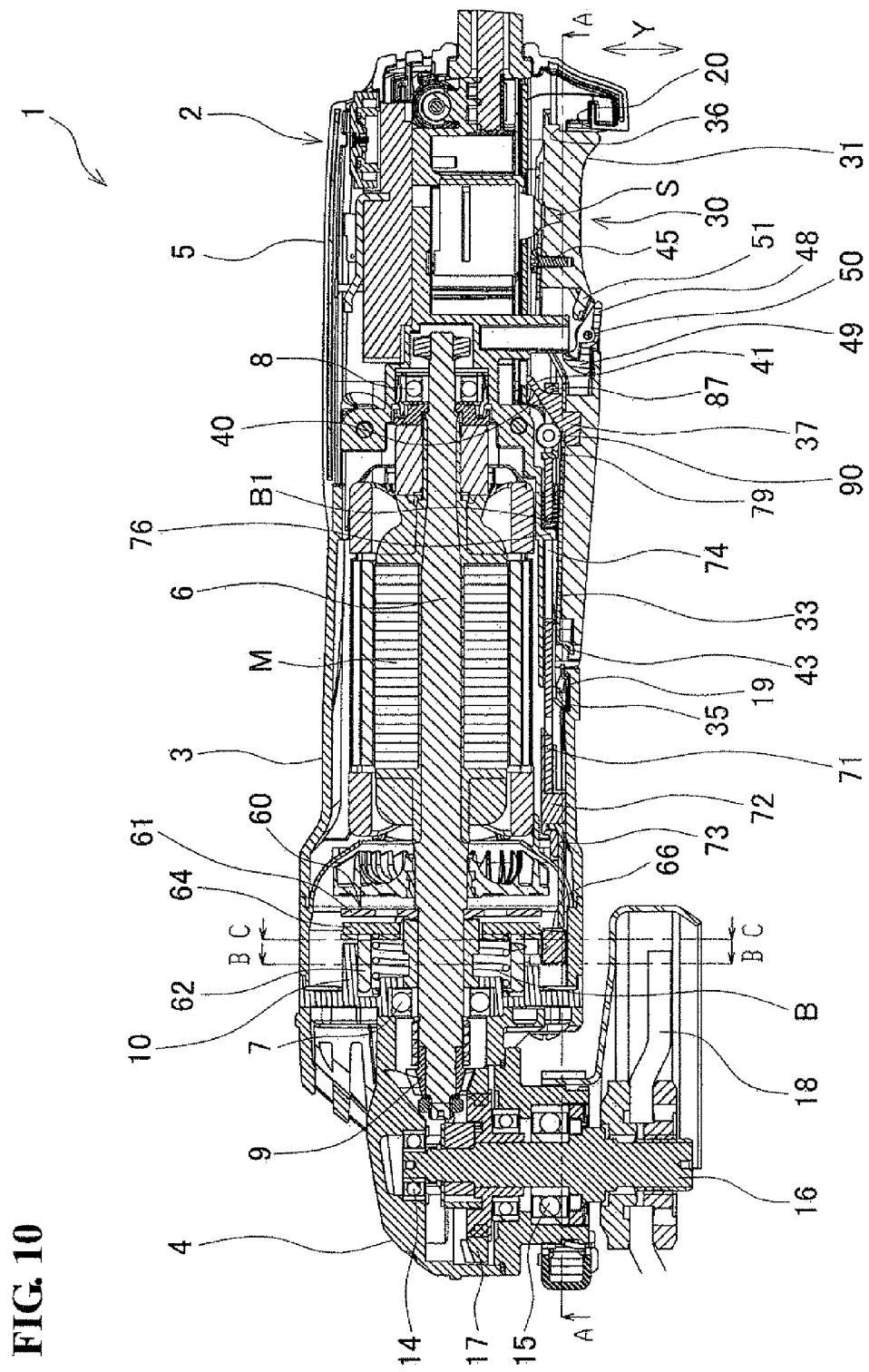
FIG. 10 is a side-sectional view of a grinder, showing the state in which a brake member is separated from a brake plate.

The paddle switch 30 is used to turn on and off the switch S. FIG. 1 shows the state in which the switch S is turned off by the paddle switch 30, and FIG. 10 shows the state in which the switch S is turned on by the paddle switch 30. In the state of FIG. 10, an outside surface of the paddle switch 30 is continuous with a lower surface of the motor housing 3 and a lower surface of the rear cover 5.

Figure 4:
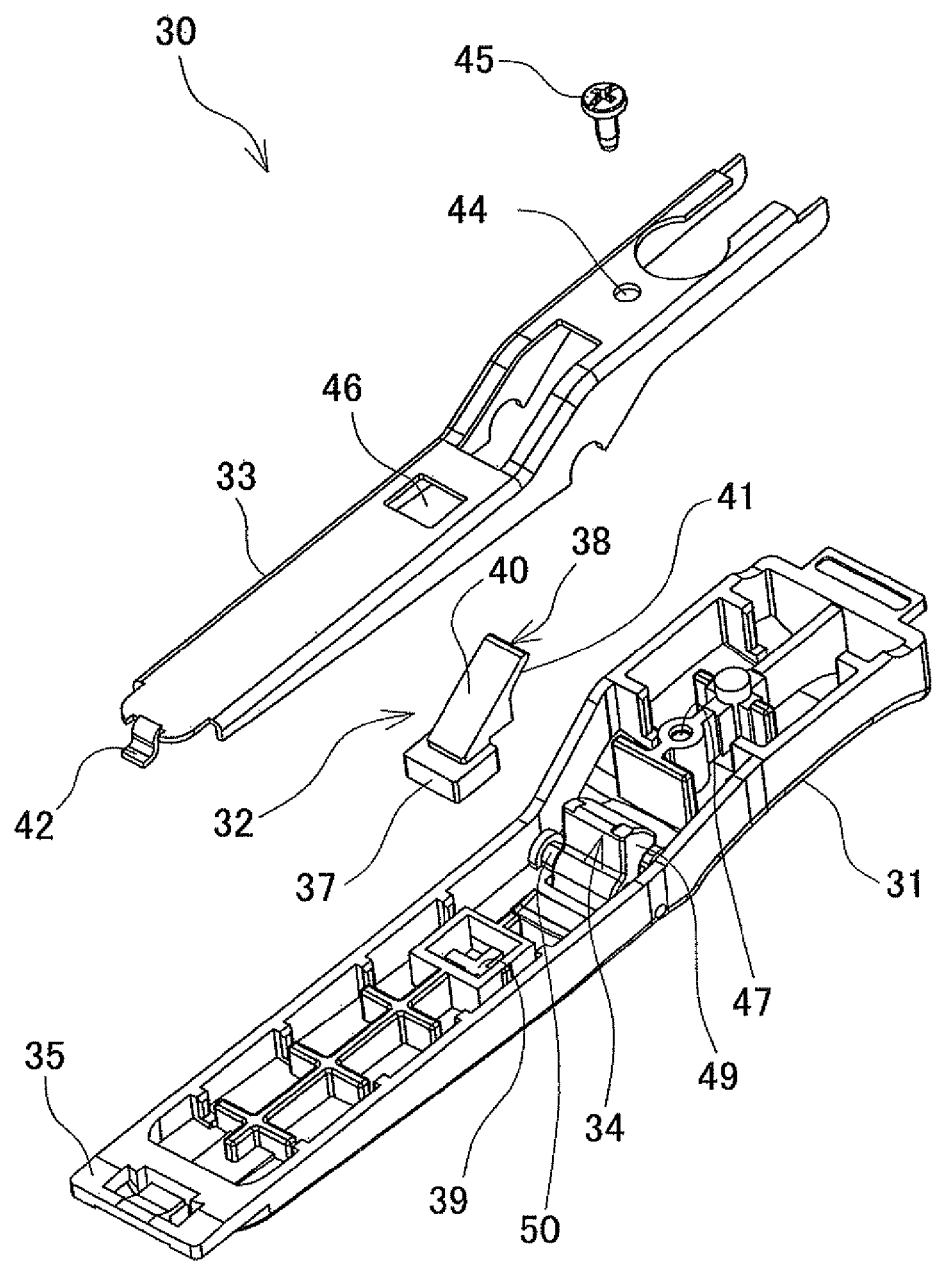
FIG. 4 is an exploded perspective view of a grip member, a tilted guide member, and a reinforcing member, which form a paddle switch of the grinder.

As shown in FIGS. 1 and 4, the paddle switch 30 includes a grip member 31, a tilted guide member 32, a reinforcing member 33, and a lock member 34. The grip member 31 is shaped to open upward, and extends between the lower surface of the motor housing 3 and the lower surface of the rear cover 5, as shown in FIG. 1. As shown in FIG. 4, an engagement protrusion 35 is formed at a front end of the grip member 31. An engagement stepped portion 36 (see FIG. 1) is formed at a rear end of the grip member 31. In the turned-off state shown in FIG. 1, the engagement protrusion 35 engages with an engagement recess 19 (see FIG. 1) of the motor housing 3, and the engagement stepped portion 36 engages with an engagement recess 20 (see FIGS. 1 and 10) of the rear cover 5. The paddle switch 30 is an example of the operation member of the present invention.

As shown in FIG. 4, the tilted guide member 32 includes a base end 37 and a protruding portion 38 protruding upward from the base end 37. The base end 37 is capable of being fitted in a fitting hole 39 provided in an inner bottom surface of the grip member 31. A first tilted surface 40 that is tilted downward toward the front side is formed on a surface of the protruding portion 38. A second tilted surface 41 tilted parallel to the first tilted surface 40 is formed on the back side of the first tilted surface 40.

The reinforcing member 33 is used to increase rigidity of the grip member 31. This reinforcing member 33 is made of metal plate, and is formed into a shape conforming to an end face of an upper edge of the grip member 31. As shown in FIG. 4, a latch claw 42 is formed at a front end of the reinforcing member 33. The latch claw 42 is capable of being latched in a latch recess 43 (see FIG. 1) of the grip member 31. A through hole 44 is formed in a rear end upper surface of the reinforcing member 33. A screw 45 can be inserted into the through hole 44. Moreover, an opening 46 (see FIG. 4) is formed in the upper surface of the reinforcing member 33 at a position near the center in a longitudinal direction (the lateral direction in FIG. 1) of the reinforcing member 33. With the protruding portion 38 protruding upward from the opening 46, the latch claw 42 is latched in the latch recess 43, and the screw 45 inserted in the through hole 44 is tightened into a threaded hole 47 (see FIG. 4) of the grip member 31. The reinforcing member 33 is thus attached to the grip member 31. This allows the tilted guide member 32 to be interposed and fixed between the grip member 31 and the reinforcing member 33. With the above configuration, the paddle switch 30 is supported by the motor housing 3 so that the paddle switch 30 can be operated to move in a direction Y perpendicular to the output shaft 6 while turning using as a fulcrum the engagement recess 19 with which the engagement protrusion 35 is engaged. The motor housing 3 is an example of the housing of the present invention, and the engagement recess 19 is an example of the fulcrum portion of the present invention.

The lock member 34 is used to prevent the paddle switch 30 from being operated to move in the perpendicular direction Y while turning. As shown in FIG. 1, the lock member 34 includes an operation portion 48 and an engagement portion 49. The operation portion 48 and the engagement portion 49 are provided so as to be connected together with a rotating shaft 50 provided therebetween. The rotating shaft 50 is supported by an inner wall surface of the grip member 31. In the turned-off state shown in FIG. 1, the engagement portion 49 is biased by a torsion coil spring (not shown) so as to be engaged with an engagement protrusion 51 of the grip member 31. At this time, the engagement portion 49 contacts the rear cover 5, thereby preventing the paddle switch 30 from being operated to move in the perpendicular direction Y while turning.

Figure 5:
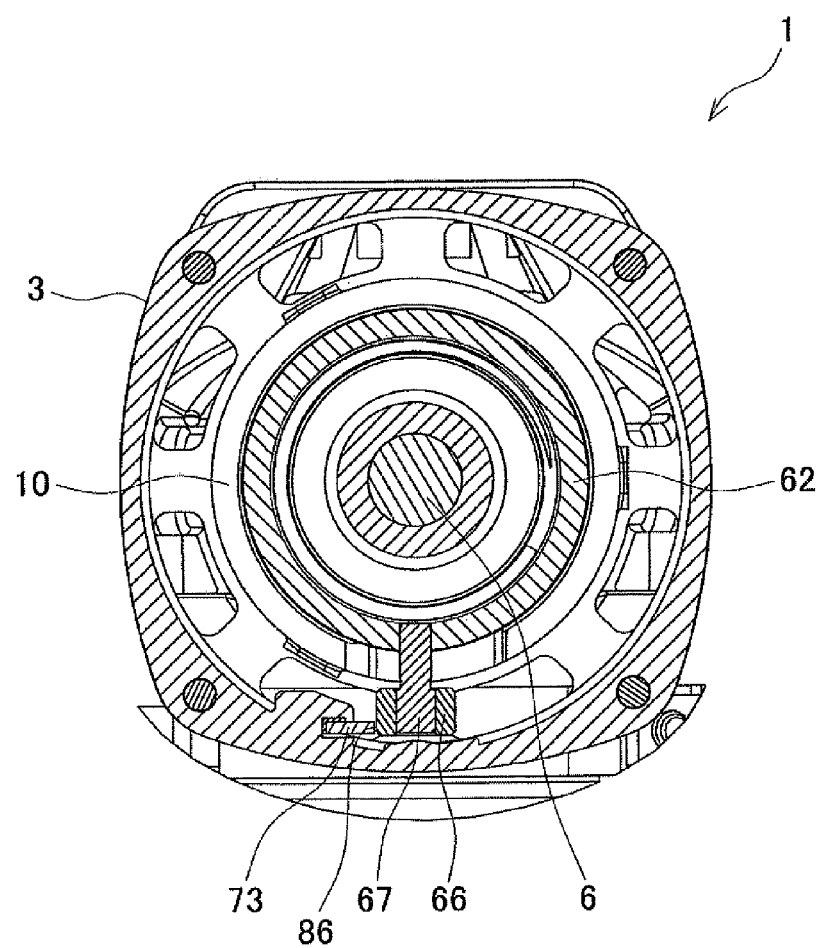
FIG. 5 is a cross-sectional view taken along line C-C in FIG. 1.

As shown in FIG. 1, the brake device 60 is provided on the front side (the left side in FIG. 1) of the motor M in the motor housing 3. This brake device 60 is used to stop the spindle 16 by braking rotation of the output shaft 6 of the motor M. As shown in FIGS. 1, 3, and 5, the brake device 60 has a brake plate 61, a brake member 62, and a coil spring B.

The brake plate 61 is fitted on the output shaft 6 and is fixed to extend perpendicularly to the output shaft 6. As shown in FIG. 1, the brake member 62 is placed in front of the brake plate 61 in an axial direction (the lateral direction in FIG. 1) of the output shaft 6. The brake member 62 is held in the motor housing 3 via the annular rib 10. As described below, the brake member 62 is capable of moving toward or away from the brake plate 61 while rotating. A brake shoe 64 (see FIG. 1) is fixed to a rear surface of the brake member 62, which faces the brake plate 61.

As shown in FIGS. 1 to 3 and FIG. 5, the brake member 62 includes three lead grooves 65 and a first rolling element 66. The lead grooves 65 are formed in the outer periphery of the brake member 62 so as to be tilted in a direction opposite to the rotation direction of the output shaft 6. As shown in FIG. 3, the shift pins 11 to 13 are loosely inserted in the lead grooves 65, respectively. As shown in FIGS. 1 and 5, the first rolling element 66 is rotatably shaft-supported by a pin 67 that protrudes beyond the outer periphery of the brake member 62 in a radial direction of the brake member 62.

The coil spring B is disposed in the motor housing 3 so as to always bias the brake member 62 in such a direction that the brake member 62 contacts the brake plate 61. Accordingly, in the turned-off state shown in FIG. 1, the brake shoe 64 is firmly pressed against the brake plate 61 due to the biasing force of the coil spring B.

Figure 6:
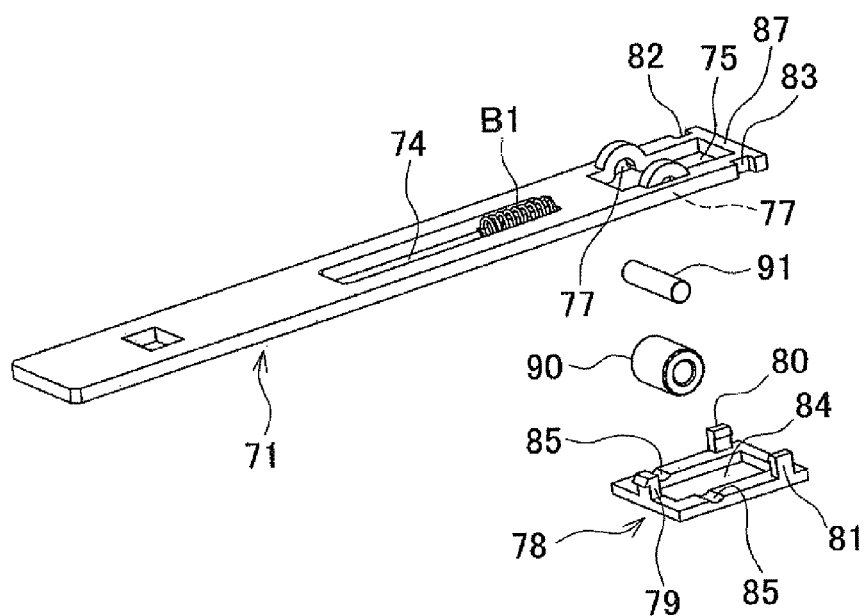
FIG. 6 is an exploded perspective view of a second rolling element and a rolling element attachment member, which are attached to a main body portion of a slide member of the grinder.
Figure 7:
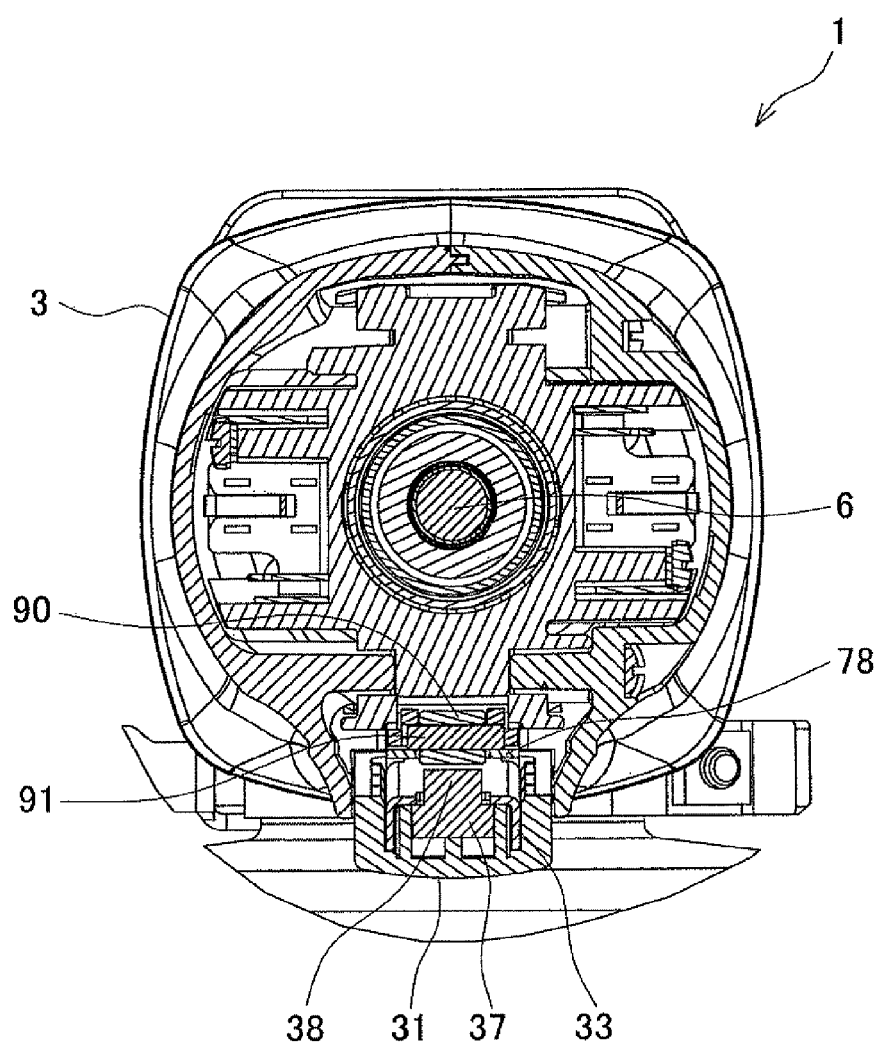
FIG. 7 is a cross-sectional view taken along line D-D in FIG. 1.
Figure 8:
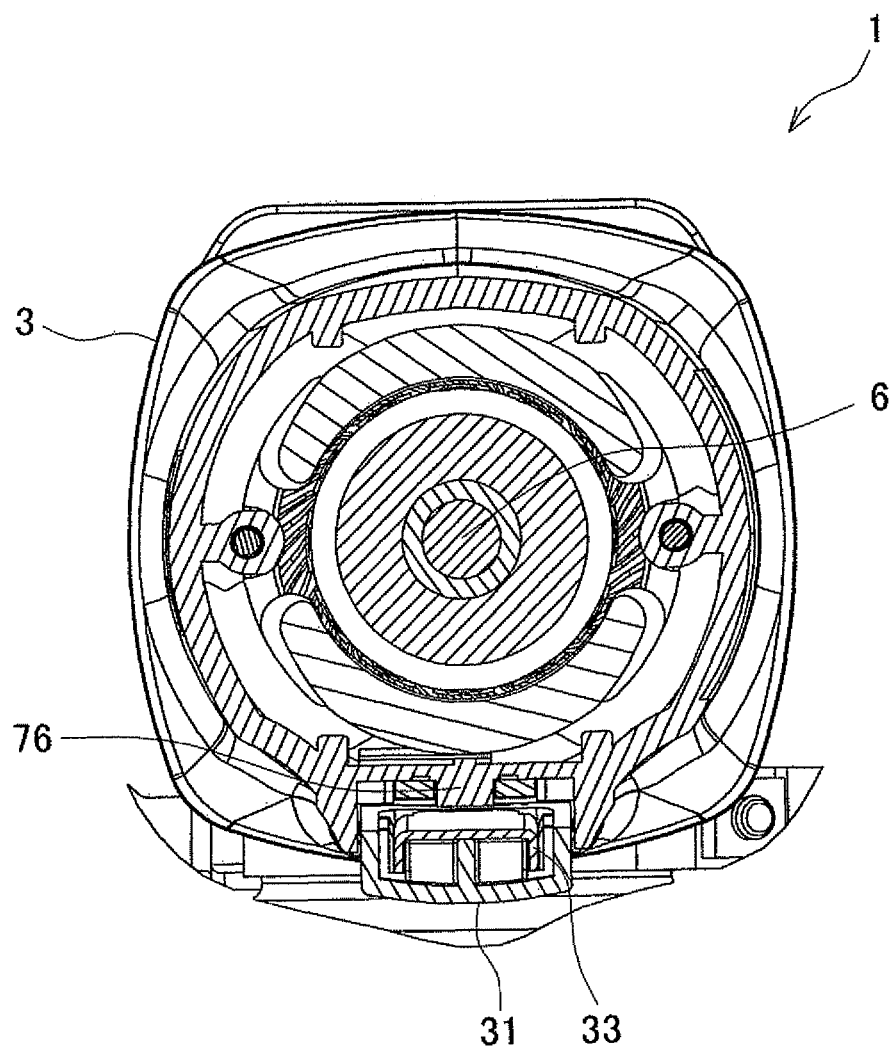
FIG. 8 is a cross-sectional view taken along line E-E in FIG. 1.
Figure 9:
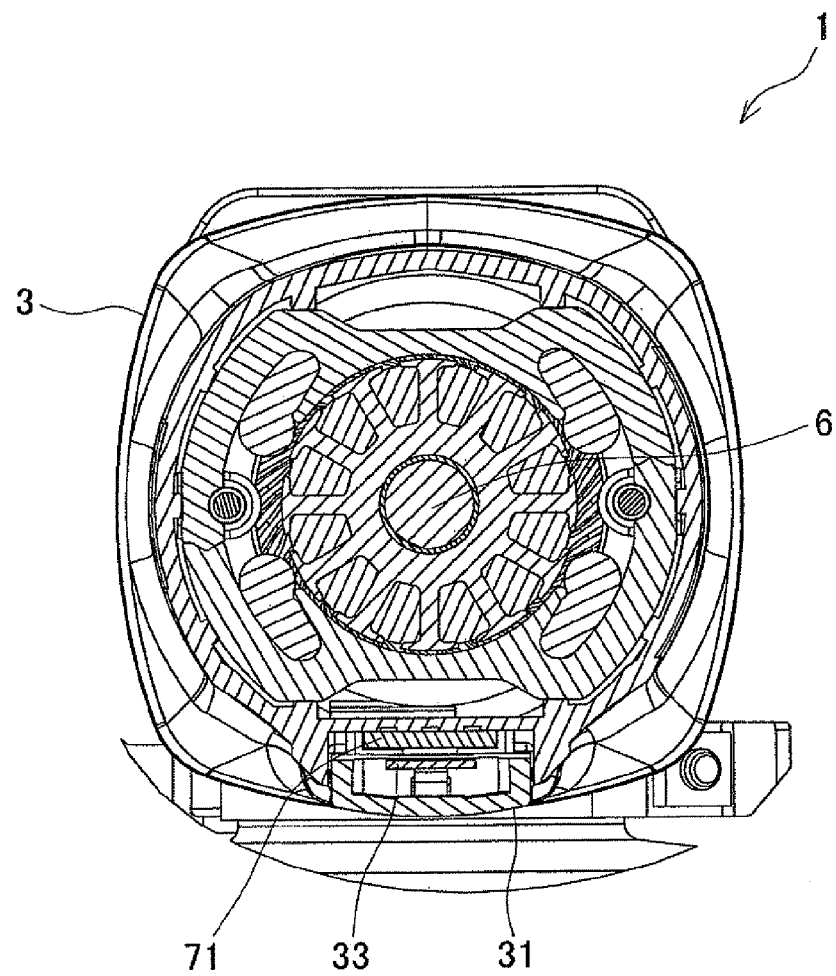
FIG. 9 is a cross-sectional view taken along line F-F in FIG. 1.

The slide member 70 is capable of sliding in the motor housing 3 in the longitudinal direction of the motor housing 3. As shown in FIGS. 1, 2, and 5, the slide member 70 includes a main body portion 71, a joint portion 72, and a brake-member operation bar 73. As shown in FIGS. 1 and 6, the main body portion 71 is formed of a metal plate extending in the longitudinal direction (the lateral direction in FIG. 1) of the motor housing 3 and the rear cover 5. As shown in FIG. 6, the main body portion 71 is provided with a long hole 74 that accommodates a coil spring B1, and a rectangular hole 75. The long hole 74 is formed near the center in a direction in which the main body portion 71 extends, so as to have an elongated shape in the longitudinal direction. As shown in FIGS. 1, 2, and 8, a standing wall member 76 extending downward from a reinforcing rib in the motor housing 3 is inserted in the long hole 74. The coil spring 131 is held between the standing wall member 76 and a rear end face of the long hole 74. The rectangular hole 75 is formed on the rear side in the extending direction of the main body portion 71. Rotating-shaft receiving holes 77, 77 (see FIG. 6) are provided in an inner peripheral surface of the rectangular hole 75 so as to face each other in a direction perpendicular to the extending direction of the main body portion 71.

As shown in FIG. 6, a rolling-element attachment member 78 is fixed to a lower surface of the main body portion 71. First to third fixing projections 79 to 81 are provided on an upper surface of the rolling-element attachment member 78 so as to protrude upward. As shown in FIG. 1, the first fixing projection 79 is inserted in the rectangular hole 75 from the lower surface of the main body portion 71 so that a tip end of the first fixing projection 79 is engaged with an upper surface of the main body portion 71. The second fixing projection 80 and the third fixing projection 81 are fitted in fitting grooves 82, 83 (see FIG. 6) formed in side surfaces of the main body portion 71, respectively, so that tip ends of the fixing projections 80, 81 are engaged with the upper surface of the main body portion 71. Moreover, as shown in FIG. 6, an opening 84 is provided in the rolling-element attachment member 78, and rotating-shaft receiving grooves 85, 85 are provided in an upper surface of the rolling-element attachment member 78. When the fixing projections 79 to 81 are engaged with the upper surface of the main body portion 71, the rectangular hole 75 is aligned with the opening 84, and the rotating-shaft receiving holes 77, 77 face the rotating-shaft receiving grooves 85, 85. In this state, a rotating shaft 91 of a second rolling element 90 is supported by the rotating-shaft receiving holes 77, 77 and the rotating-shaft receiving grooves 85, 85. The second rolling element 90 can thus be rotatably supported by the rotating shaft 91.

As shown in FIGS. 1 and 2, the joint portion 72 is coupled to a tip end of the main body portion 71. The joint portion 72 is capable of sliding in the longitudinal direction of the motor housing 3 along an inner bottom surface of the motor housing 3. The brake-member operation bar 73 is coupled to a tip end of the joint portion 72. As shown in FIG. 2, the brake-member operation bar 73 has a tilted surface 86 on its tip end side, which is formed by cutting the brake-member operation bar 73 in a direction that crosses the centerline of the brake-member operation bar 73. The centerline extends in a longitudinal direction of the brake-member operation bar 73. As shown in FIGS. 2 and 5, the tilted surface 86 is capable of contacting the brake member 62 via the first rolling element 66.

Next, an operation of releasing the brake device 60 will be described, which is performed in response to an operation (hereinafter referred to as the "pushing operation") of pushing the paddle switch 30 toward the housing 2 in the perpendicular direction Y to turn on the switch S in the grinder 1 of the present embodiment. As shown in FIG. 1, when the switch S is in the turned-off state, the brake member 62 is positioned such that the brake shoe 64 contacts the brake plate 61. In addition, in the turn-off state, the tilted guide member 32 of the paddle switch 30 passes through the rectangular hole 75 of the slide member 70 (the main body portion 71) via an opening H (see FIG. 1) in a bottom surface of the rear cover 5 at a position P (see FIG. 1) on the rear side (the right side in FIG. 1) of the motor M in the longitudinal direction of the motor housing 3. Thus, the first tilted surface 40 of the paddle switch 30 is in contact with the second rolling element 90 of the slide member 70. In this state, the second rolling element 90 is pressed against the first tilted surface 40 due to the biasing force of the coil spring B1 of the slide member 70, and the paddle switch 30 is biased in a direction away from the housing 2 in the perpendicular direction Y. The paddle switch 30 is also biased in the direction away from the housing 2 by a spring member (not shown) contained in the switch S. Moreover, in the turned-off state, the lock member 34 prevents the paddle switch 30 from being operated to turn and move. The coil spring B1 is an example of the biasing unit of the present invention.

Before performing the pushing operation, the engagement portion 49 of the lock member 34 is disengaged from the engagement protrusion 51 of the paddle switch 30 in order to allow the paddle switch 30 to be operated to turn and move. In this example, the engagement portion 49 of the lock member 34 can be disengaged from the engagement protrusion 51 of the paddle switch 30 by turning the operation portion 48 of the lock member 34 about the rotating shaft 50 against the biasing force of the torsion coil spring. If the operator then holds the rear cover 5 and the grip member 31 of the paddle switch 30 to perform the pushing operation, the switch S is pressed by the grip member 31 and turned on. By the pushing operation, as shown in FIGS. 1 and 10, the second rolling element 90 rolls on the first tilted surface 40 while being in contact therewith. At this time, the slide member 70 including the second rolling element 90 compresses the coil spring B1 and slides toward the front side of the motor M. In this manner, the pushing operation of the paddle switch 30 can be performed in response to the slide operation of the slide member 70. The second rolling element 90 is an example of the rolling element of the present invention, and the position P is an example of the cooperative position of the present invention.

Figure 11:
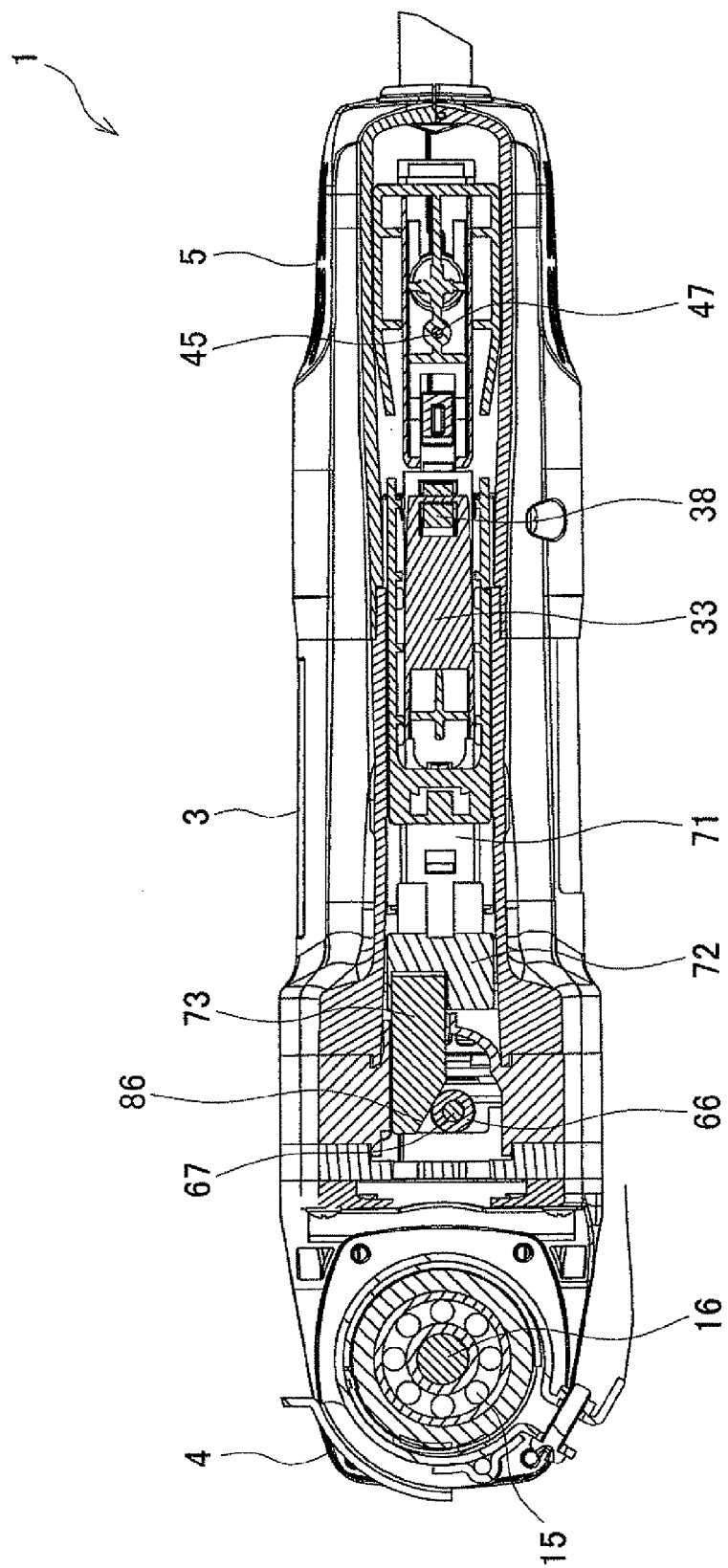
FIG. 11 is a cross-sectional view taken along line A-A in FIG. 10.
Figure 12:
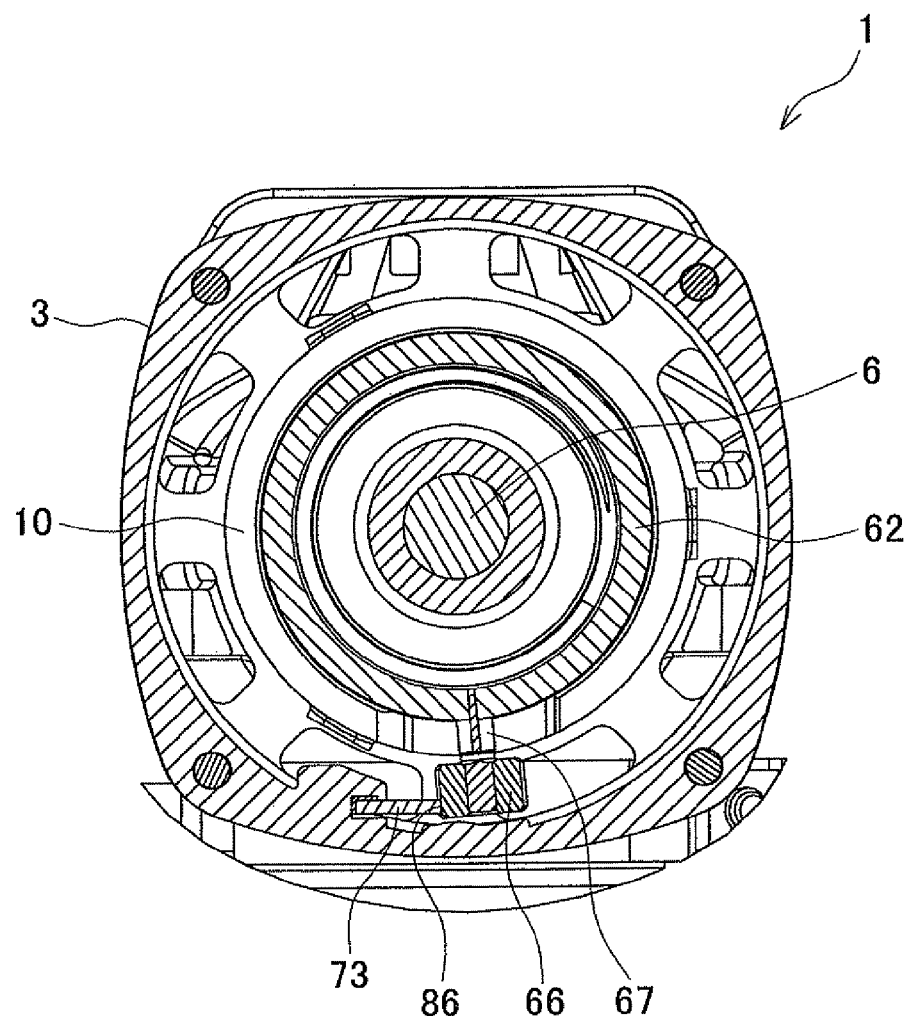
FIG. 12 is a cross-sectional view taken along line C-C in FIG. 10.
Figure 13:
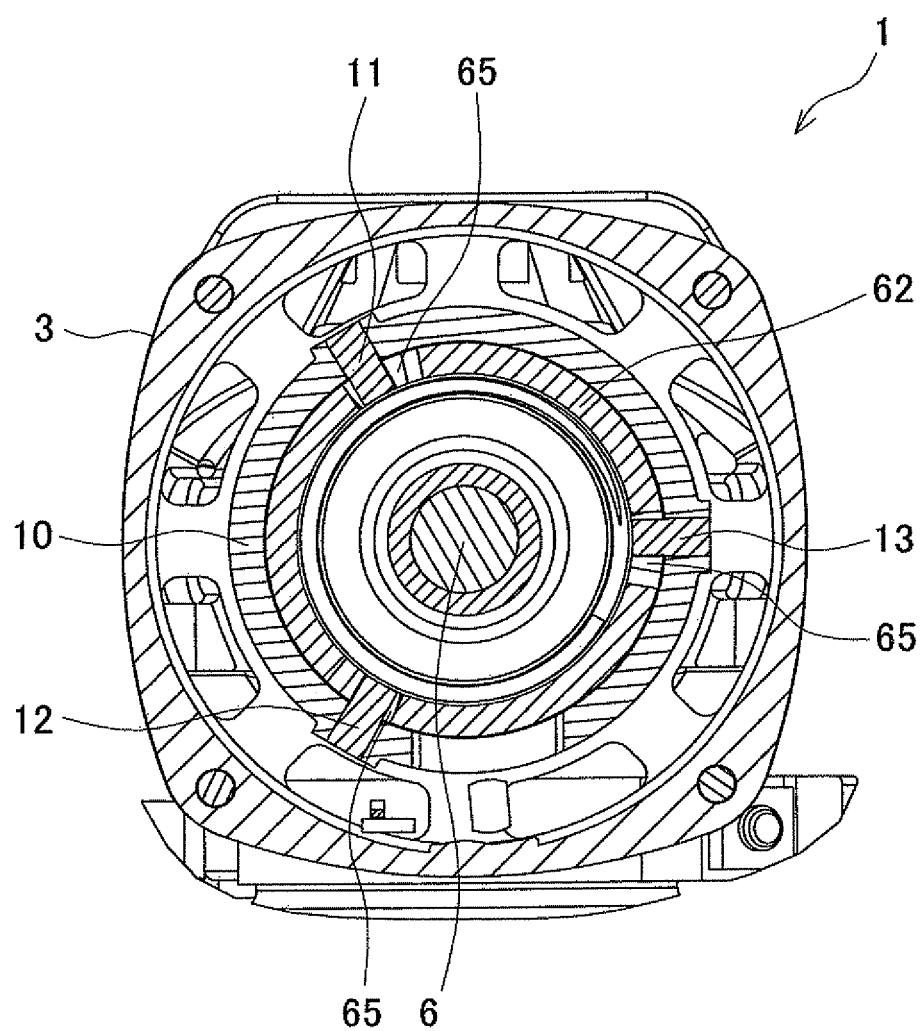
FIG. 13 is a cross-sectional view taken along line B-B in FIG. 10.

As shown in FIGS. 2 and 11, when the slide member 70 slides toward the front side of the motor M, the brake-member operation bar 73 of the slide member 70 also slides toward the front side of the motor M. At this time, as shown in FIGS. 2, 11, and 12, the first rolling element 66 of the brake member 62 rolls on the tilted surface 86 while being in contact therewith, thereby rotating the brake member 62 in a direction opposite to the rotation direction of the output shaft 6. At this time, as shown in FIGS. 3 and 13, the shift pins 11 to 13 relatively slide in the three lead grooves 65. Thus, the brake member 62 advances toward the gear housing 4 against the biasing force of the coil spring B (see FIG. 10) while being held by the annular rib 10.

When the brake member 62 rotates in the direction opposite to the rotation direction of the output shaft 6 as described above, the brake member 62 moves in a direction away from the brake plate 61 while rotating. As a result, as shown in FIG. 10, the brake shoe 64 fixed to the brake member 62 is separated from the brake plate 61 and is not pressed against the brake plate 61. Thus, the brake device 60 can be released by causing the slide member 70 to slide toward the front side of the motor M. The brake-member operation bar 73 is an example of the pressing member of the present invention, and the first tilted surface 40, the second rolling element 90, and the slide member 70 are an example of the cooperative mechanism of the present invention.

If the operator releases the grip member 31 to cancel the pushing operation, the brake member 62 is no longer pressed by the brake-member operation bar 73, and withdraws toward the motor housing 3 so as to move toward the brake plate 61 due to the biasing force of the coil spring B. At this time, with the guidance of the lead grooves 65 in which the shift pins 11 to 13 slide, the brake member 62 withdraws while rotating in a direction opposite to that in the case where the switch S is turned on. As a result, the brake shoe 64 is pressed against the brake plate 61 as shown in FIG. 1. Thus, the brake plate 61 is subjected to the braking force, and rotation of the output shaft 6 is immediately stopped.

Moreover, if the operator releases the grip member 31, the paddle switch 30 moves in the direction away from the housing 2 in the perpendicular direction Y while turning by using the engagement recess 19 of the motor housing 3 as a fulcrum, due to the biasing force of the coil spring B1 of the slide member 70 and the biasing force of the spring member of the switch S. Thus, the paddle switch S is restored to the turned-off state of the switch S shown in FIG. 1. At this time, as shown in FIGS. 10 and 1, a rear end 87 (see FIGS. 6 and 10) of the main body portion 71, which is engaged with the second tilted surface 41, is guided by the second tilted surface 41, and the slide member 70 slides toward the rear side of the motor M.

Since the grinder 1 of the present embodiment includes the cooperative mechanism (the first tilted surface 40, the second rolling element 90, and the slide member 70), the brake device 60 can be released in response to the pushing operation of the paddle switch 30. Thus, the grinder 1 can be provided with the brake device 60, and can still be easily operated by turning on the switch S by the pushing operation.

The slide member 70 that releases the brake device 60 can be made to slide toward the front side of the motor M in response to the pushing operation, from the position P that is located on the rear side of the motor M and away from the brake device 60 in the motor housing 3. Thus, the operation of releasing the brake device 60 can be performed at the position P located away from the brake device 60.

In the present embodiment, the slide member 70 slides toward the front side of the motor M as the second rolling element 90 rolls on the first tilted surface 40. The use of the second rolling element 90 reduces the frictional resistance of the contact portion between the second rolling element 90 and the first tilted surface 40. This allows the slide member 70 to smoothly slide toward the front side of the motor M.

Moreover, in the present embodiment, the paddle switch 30 moves in the direction away from the housing 2 in the perpendicular direction Y while turning. The use of the second tilted surface 41 engaged with the rear end 87 of the main body portion 71 of the slide member 70 allows the slide member 70 to smoothly slide toward the rear side of the motor M.

Furthermore, when the pushing operation is cancelled and the brake device 60 stops rotation of the output shaft 6, the paddle switch 30 is biased by the coil spring 81 of the slide member 70 in the direction away from the housing 2 in the perpendicular direction Y. Thus, when the pushing operation is cancelled, the paddle switch 30 can be reliably restored to the turned-off state of the switch S due to the biasing force of the coil spring B1.

The paddle switch 30 can be operated to move in the perpendicular direction Y while turning by using the engagement recess 19 in the motor housing 3 as a fulcrum. Thus, providing the engagement recess 19 in the motor housing 3 allows the pushing operation to be easily performed.

Moreover, causing the brake member 62 to move in the direction away from the brake plate 61 while rotating using the brake-member operation bar 73 of the slide member 70 can reduce the moment of force that is applied to the brake member 62. Thus, satisfactory operability is obtained when releasing the brake device 60.

The present invention is not limited to the above embodiment, and the configuration may be partially modified as appropriate without departing from the spirit and scope of the invention. For example, unlike the above embodiment, the first tilted surface 40 may be formed in the slide member 70 and the second rotating element 90 may be rotatably provided in the paddle switch 30 so that the slide member 70 slides toward the front side of the motor M.

Unlike the above embodiment, the second rolling element 90 may not be used, and tilted surfaces may be formed in both the paddle switch 30 and the slide member 70 at the position P on the rear side of the motor M so as to face each other. In this case, in the pushing operation, the tilted surface of the slide member 70 slides along the tilted surface of the paddle switch 30, whereby the slide member 70 slides toward the front side of the motor M. In the case where the tilted surfaces are formed in both the paddle switch 30 and the slide member 70, the tilted surface of the slide member 70 is guided by the tilted surface of the paddle switch 30, which allows the slide member 70 to smoothly slide toward the front side of the motor M. Alternatively, a tilted surface may be formed in one of the paddle switch 30 and the slide member 70 at the position P on the rear side of the motor M, so that the slide member 70 is guided by the tilted surface and slides toward the front side of the motor M in the pushing operation. Even in the case where the tilted surface is formed in one of the paddle switch 30 and the slide member 70, the slide member 70 is guided by the tilted surface, which allows the slide member 70 to smoothly slide toward the front side of the motor M.

Unlike the above embodiment, the paddle switch 30 may be biased in the direction away from the housing 2 in the perpendicular direction Y by using only the spring member contained in the switch S. Although the above embodiment is described with respect to an example in which the present invention is applied to a grinder, the present invention is not limited to this, and may be applied to electric power tools such as a sander.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An electric power tool, comprising:
   a housing;
   a motor accommodated in the housing so that an output shaft faces forward;
   an operation member that is supported by the housing so that the operation member can be operated to move in a direction perpendicular to the output shaft of the motor, and that turns on and off a drive switch of the motor;
   a brake device that is provided on a front side of the motor in the housing to brake rotation of the output shaft; and
   a cooperative mechanism that releases the brake device in response to a pushing operation of pushing the operation member toward the housing to turn on the drive switch,
   wherein the cooperative mechanism includes a slide member that is accommodated in the housing, and that is capable of sliding toward the front side in response to the pushing operation of the operation member, and the slide member slides toward the front side to release the brake device,
   the operation member contacts with the slide member at a contact position which is located on a rear side of the motor, such that the pushing operation of the operation member is changed to the sliding movement of the slide member at the contact position, and
   a first tilted surface is provided in the operation member at the contact position, and a rolling element that rolls on the first tilted surface in the pushing operation is provided in the slide member at the contact position.

2. The electric power tool according to claim 1, wherein the operation member at the contact position includes a second tilted surface formed on a back side of the first tilted surface, and the second tilted surface engages with the slide member, and causes the slide member to slide toward the rear side as the operation member moves in a direction away from the housing in the perpendicular direction.

3. The electric power tool according to claim 1, further comprising:
   a biasing unit that biases the operation member toward an OFF side of the drive switch in a direction away from the housing in the perpendicular direction when braking the rotation of the output shaft.

4. The electric power tool according to claim 1, wherein the housing is provided with a fulcrum portion that supports the operation member so that the operation member is turnable in the perpendicular direction, and the operation member is capable of being operated to move in the perpendicular direction about the fulcrum portion.

5. The electric power tool according to claim 1, wherein the brake device includes a brake member that is held in the housing and that is capable of moving to and away from a brake plate fixed to the output shaft while rotating, and the slide member is provided with a pressing member that contacts the brake member to rotate the brake member in such a rotation direction that the brake member separates from the brake plate.

6. The electric power tool according to claim 2, wherein the operation member includes a grip member that is supported by a lower surface of the housing so as to be turnable in the perpendicular direction and that opens upward, a reinforcing member that is attached to the grip member along an end face of an upper edge of the grip member and that has an opening formed in an upper surface thereof so as to open at the contact position, and a tilted guide member that is attached to an inner bottom surface of the grip member, that protrudes through the opening, and that has the first tilted surface formed therein, a rectangular hole through which the tilted guide member is inserted is provided at the contact position in the slide member, and the second tilted surface is formed on a back side of the first tilted surface in the tilted guide member, and when the operation member moves in the direction away from the housing in the perpendicular direction, the slide member that engages with the second tilted surface is guided by the second tilted surface, whereby the slide member is caused to slide toward the rear side.

7. The electric power tool according to claim 4, wherein the operation member includes a grip member having, at a front end thereof, an engagement protrusion, and an engagement recess with which the engagement protrusion is engaged is formed as the fulcrum portion in a lower surface of the housing, and the grip member is supported by the housing so as to be turnable in the perpendicular direction by using as a fulcrum the engagement recess with which the engagement protrusion is engaged.

8. The electric power tool according to claim 5, wherein the brake member is provided with a rolling element that protrudes outward beyond the brake member and that is rotatably supported, and the pressing member is a brake-member operation bar that is coupled to the slide member and that has a tilted surface on which the rolling element rolls while being in contact therewith, when the slide member slides toward the front side, and when the slide member slides, the rolling element is guided by the tilted surface to rotate the brake member.

9. An electric power tool, comprising:

a housing;

a motor accommodated in the housing so that an output shaft faces forward;

an operation member that is supported by the housing so that the operation member can be operated to move in a direction perpendicular to the output shaft of the motor, and that turns on and off a drive switch of the motor;

a brake device that is provided on a front side of the motor in the housing to brake rotation of the output shaft; and a cooperative mechanism that releases the brake device in response to a pushing operation of pushing the operation member toward the housing to turn on the drive switch, wherein the housing is provided with a fulcrum portion that supports the operation member so that the operation member is turnable in the perpendicular direction, and the operation member is capable of being operated to move in the perpendicular direction about the fulcrum portion, the operation member includes a grip member having, at a front end thereof, an engagement protrusion, and an engagement recess with which the engagement protrusion is engaged is formed as the fulcrum portion in a lower surface of the housing, and the grip member is supported by the housing so as to be turnable in the perpendicular direction by using as a fulcrum the engagement recess with which the engagement protrusion is engaged.

* * * * *